United States Patent [19]

Ito et al.

[11] Patent Number: 5,599,493
[45] Date of Patent: Feb. 4, 1997

[54] METHOD OF PRODUCING SILICON NITRIDE CERAMIC COMPONENT

[75] Inventors: Yasushi Ito; Takehisa Yamamoto; Takao Nishioka; Akira Yamakawa; Osamu Komura, all of Itami, Japan

[73] Assignee: Sumitomo Electric Industries, Ltd., Japan

[21] Appl. No.: 429,067

[22] Filed: Apr. 26, 1995

[30] Foreign Application Priority Data

Apr. 26, 1994  [JP]  Japan .................................... 6-109113

[51] Int. Cl.$^6$ .................................................. B29C 71/02
[52] U.S. Cl. ............................ 264/234; 264/60; 264/235; 264/345; 264/346
[58] Field of Search .............................. 264/140, 60, 234, 264/235, 345, 346

[56] References Cited

U.S. PATENT DOCUMENTS 5,369,065  11/1994  Yoshimura et al. .
5,384,292  1/1995  Matsui et al. .

FOREIGN PATENT DOCUMENTS 60-81076  5/1985  Japan .
63-55180  3/1988  Japan .
2167864  6/1990  Japan .
5149112  6/1993  Japan .

OTHER PUBLICATIONS

Copy of Database WPI, Week 8525, Derwent Publ., Ltd, London, G.B. AN 85–149087 & JP–A–60 081 076 (Hitachi KK) May 9, 1985 Abstract.

*Primary Examiner*—Donald E. Czaja
*Assistant Examiner*—Jacqueline A. Ruller
*Attorney, Agent, or Firm*—Jordan B. Bierman; Bierman and Muserlian

[57] ABSTRACT

A method of producing a silicon nitride ceramic component, comprising: grinding a silicon nitride sintered body comprising α—$Si_3N_4$ having an average grain size of 0.5 μm or smaller and β'-sialon having an average grain size of 3 μm or smaller in major axis and 1 μm or smaller in minor axis into a predetermined size with a surface roughness of 1–7 μm in ten-point mean roughness; heat treating the same at temperature range of 800°–1200° C. in the air; and standing it to allow to be cooled, whereby providing a residual stress in the ground surface before and after the heat treating as a residual compressive stress at a ratio of 1 or higher of the residual compressive stress after the heat treating to that before the heat treating (residual compressive stress after the heat treating/residual compressive stress before the heat treating), preferably 5 or more.

16 Claims, No Drawings

METHOD OF PRODUCING SILICON NITRIDE CERAMIC COMPONENT

BACKGROUND OF THE INVENTION

1. Field of the Invention

The present invention relates to a method of producing a ground component of silicon nitride ceramic, and more particularly to a method of adding strength to a processed surface thereof.

2. Description of the Prior Art

Silicon nitride ceramics have attracted attention as a material for a mechanical part used under extremely severe conditions because of their lightweight and superior wear resistance, strength and high-temperature strength thereof. Since the mechanical parts used under such circumstances are required to be processed with a high precision and a high level of quality, grinding with diamond wheels are typically used to finish the part to a desired shape.

However, it has been reported that cracks parallel to the grinding direction are formed in the processed surface during the grinding process, which makes the inherent strength of the material remarkably degraded (see, for example, Imai et al., "Toyota Tool and Machine Technical Report", Vol. 26, No. 3.4, Pages 25–26).

On the other hand, residual compressive stresses are generated in the ground surface of the material along with the cracks formed therein, restraining degradation of the strength. The residual compressive stresses are, however, insufficient to restore the strength because of the grinding crack having greater influence on the degradation of the strength. It has also been reported that the residual compressive stresses in the processed surface is reduced by heat treatment at 1200° C. for 2 hours in a vacuum (see, Suzuki et al., "Material", Vol. 38, No. 429, Pages 584–585).

Therefore, it is considered very important to restrain any damages on the material surface as much as possible in grinding ceramic components. To satisfy this requirement, the grinding was performed with diamond abrasive grains of a small grain size. However, the grinding with the diamond abrasive grains of the small grain size was not always an effective and preferable choice from the viewpoint of productivity and cost.

Studies have thus been made to improve the strength of the ground surface in grinding ceramic components, and various methods have been proposed and practiced. For example, Japanese Patent Laid-Open No. 4-243988 discloses a method for strengthening a surface of a ceramic base comprising coating the surface of the ceramic base with a different kind of oxide ceramic having a large thermal expansion coefficient, firing the coated ceramic and cooling the same to provide a residual compressive stress in the surface of the ceramic base by using the difference in thermal expansion coefficient. It is, however, pointed out that this method complicates the production process and is thus insufficient from the viewpoint of the cost and the productivity.

Japanese Patent Laid-Open No. 2-167864 discloses a method of improving strength by the effects of crack healing and increased residual compressive stress comprising finishing a processed surface of a ceramic to have a roughness of 1–3 μm measured by the maximum surface roughness (Rmax), heating it at 1000°–1300° C. to form an oxide film, getting the growth of the grinding crack dull, and cooling the surface from a temperature of 400°–500° C. at a rate of 50° C. per minute or higher to generate the residual compressive stress in the treated surface. However, it is pointed out that this method requires two steps of heat treatment, has some limitations on cooling equipment, and is less reliable because not all grinding cracks are subjected to the healing effect by the first heat treatment step.

Alternatively, some attempts have been made to heal the crack in the processed surface formed during grinding with an oxide film by means of heat treatments at various temperatures and in various atmospheres, thereby improving and ensuring the quality level of the material. For example, Japanese Patent Laid-Open No. 60-81076 discloses that Si in the ceramic is reacted with oxygen in the air by keeping a silicon nitride ceramic at 950°–1400° C. for 30 minutes or more, thereby producing an oxide which eliminates defects such as scratches and cracks formed in the material surface, improving the flexural strength.

Japanese Patent Laid-Open No. 1-52679 discloses that, as a method for improving strength of sialon, the material heat-treated in a temperature range of 800°–1100° C., especially 900°–950° C., in the air would have a strength higher than defect-free materials before heat treatment, and that the reason therefor may be the oxidation of the material surface and diffusion of, for example, Al in the grain boundary phase to cover the surface with a generated layer, thereby reducing the defects such as fine grinding scratches or the like.

Japanese Patent Publication No. 3-80755 discloses that a silicon nitride sintered body including $Y_2O_3$, $Al_2O_3$, and AlN as sintering aids is ground into a predetermined shape and then heat treated in the air at a temperature lower than the sintering temperature but higher than the softening temperature of the glassy phase, namely at 800°–1100° C., for 1–24 hours so that micro cracks generated during the grinding process are repaired and an oxide film of $SiO_2$ is formed on the surface. Due to the synergistic effect of these, the mechanical strength is improved.

Japanese Patent Laid-Open No. 5-149112 discloses that, as a method of manufacturing a valve of silicon nitride ceramic comprising of 75–89% by weight of $Si_3N_4$, 1–5% by weight of $Al_2O_3$ and 10–20% by weight of $Y_2O_3$, the grinding cracks can be eliminated to provide a valve of high reliability when the ground surface is processed to have the maximum surface roughness (Rmax) of preferably 1–3 μm or less and then heat treated at 1000°–1300° C. for one hour in the air, or in an atmosphere of nitride gas or argon gas.

Japanese Patent Publication No. 4-50276 discloses to heat a sialon sintered body at 875°–950° C. for 30 minutes or more in an atmosphere including oxygen and to treat the surface with a glassy layer such as $SiO_2$, $Al_2O_3$, and $Y_2O_3$ for filling defects in the surface, thereby improving the corrosion resistance and strength.

Further, Japanese Patent Laid-Open No. 4-36759 discloses a silicon nitride sintered body with an oxide film, whose resistance to defect and wear resistance are improved by eliminating defects remaining in the surface. More specifically, a sintered body including at least one of $\alpha$-$Si_3N_4$, $\beta$-$Si_3N_4$, $\alpha'$-sialon, and $\beta'$-sialon is heated at 800°–1100° C. in an oxidative atmosphere to form an oxide film (oxide, oxynitride, oxycarbide, oxynitride carbide) of 10,000 angstrom or thinner.

All the methods described in these documents are only to improve the reliability through the heat treatment under the conditions of predetermined temperature, time and atmosphere with the resultant healing effect caused by the oxide film and a glassy layer of the assistants. As apparent from a degree of improving the strength described in examples, the effect is not sufficiently ensured from the industrial viewpoint.

SUMMARY OF THE INVENTION

With respect to these conventional problems, the present invention is directed to provide a method of producing a silicon nitride ceramic component having a high reliability, by restoring or improving remarkably degradation of strength caused in grinding, at the time of making a mechanical part of a predetermined shape by grinding a silicon nitride sintered body.

In order to achieve the above object, the present invention provides a method of producing a silicon nitride ceramic component, comprising: grinding a silicon nitride sintered body comprising $\alpha$-$Si_3N_4$ having an average grain size of 0.5 µm or smaller and $\beta'$-sialon having an average grain size of 3 µm or smaller in major axis and 1 µm or smaller in minor axis into a predetermined size with a surface roughness of 1–7 µm in ten-point mean roughness; heat treating the same at a temperature range of 800°–1200° C. in air; and standing it to allow to be cooled, thereby providing a residual stress in the ground surface before and after the heat treating as a residual compressive stress at a ratio of 1 or higher of the residual compressive stress after the heat treating to the residual compressive stress before the heat treating (residual compressive stress after the heat treating/residual compressive stress before the heat treating).

DETAILED DESCRIPTION OF THE PREFERRED EMBODIMENTS

According to the method of the present invention, a silicon nitride sintered body comprising $\alpha$-$Si_3N_4$ having an average grain size not more than 0.5 µm and $\beta'$-sialon having an average grain size not more than 3 µm in major axis and not more than 1 µm in minor axis is first produced.

As a specific method for this purpose, a sintering aid is added to a silicon nitride powder having an average grain size of 0.5 µm or smaller and having an alpha crystallization ratio of 96% or higher, which is mixed by using a ball mill or the like. The mixed powder is press-molded to form a compact body, which is sintered at 1450°–1700° C., more preferably at 1500°–1650° C., in a pressurized nitrogen atmosphere of up to 1000 atm. With respect to sintering aids, it is preferable to use $Y_2O_3$, $Al_2O_3$ and AlN as essential sintering aids, and at least one selected from the group consisting of oxides such as MgO, $TiO_2$, $ZrO_2$, and $HfO_2$, and composite oxides such as $MgAl_2O_4$, as additional sintering aid(s).

As mentioned above, the silicon nitride sintered body so obtained has a composite structure of an equi-axed $\alpha$-$Si_3N_4$ crystal phase (including $\alpha'$-sialon) and a fine columnar $\beta'$-sialon crystal phase (including $\beta$-$Si_3N_4$), compounded at a high density. Excellent characteristics in strength can thus be easily obtained, where the four-point flexural strength at a room temperature is 150 kg/mm² or more in accordance with JIS R1601. This sintered body is improved in Young's modulus and hardness compared with the conventional sintered body made by only columnar $\beta'$-sialon crystal phase. The improvement of properties indicating the deformation resistance results in improvement of the strength in a brittle material such as ceramics.

In the method of the present invention, the silicon nitride sintered body having these characteristics is ground into a predetermined size to have a surface roughness of 1–7 µm in the ten-point mean roughness (Rz). The surface roughness of the ground surface is defined within the range of 1–7 µm for the following reasons. Rz of less than 1 µm provides only a small notch effect because of irregularities, so that rupture strength is not much affected by processing direction. The present invention would thus produce less remarkable effect, which otherwise can improve the strength through the heat treatment. On the contrary, the heat treatment is not sufficient to completely repair a defect due to the irregularities caused in the grinding process if Rz is more than 7 µm. This means that the strength is not improved to an industrially satisfactory level.

The silicon nitride sintered body subjected to the grinding is heat treated at a temperature range of 800°–1200° C., preferably at 950°–1050° C. in the air. If the heat treatment is conducted at a temperature lower than 800° C., only a small amount of oxide such as $SiO_2$ is produced on the surface, and the residual compressive stress therein is not sufficiently generated. Additionally, since the softening temperature of the sintering aid in the sintered body is 800° C. or higher, softening of the glassy phase constituted of the sintering aid does not occur during the foregoing heat treatment below 800° C. Accordingly, grinding scratches or cracks or internal defects such as pores, which would be a cause of rupture, are not repaired by being filled up with the glass phase and any significant strength cannot be achieved.

Then, heat-treating time is preferably from 15 minutes to 5 hours, and more preferably from 30 minutes to 2 hours. The heat-treating time of shorter than 15 minutes produces an insufficient amount of oxides with less or no residual compressive stress. If the heat-treating temperature is higher than 1200° C. or the heat treating time is longer than 5 hours, the oxidation reaction proceeds excessively though the glassy phase of, for example, $SiO_2$ is formed on the processed surface. Therefore, pores having a size larger than the average size of the crystal grains of the ceramic component are likely to be formed in the processed surface layer, which may be a cause of rupture.

The residual stress in a ground surface was measured by means of X-ray diffraction method for the silicon nitride ceramic component subjected to the heat treatment according to the method of the present invention. The results indicated that the residual stress is in the compressive direction, that the magnitude of this residual compressive stress is larger as a grinding with high efficiency is conducted, and that the residual compressive stress has a component in the direction perpendicular to the grinding direction greater than a component in the direction parallel to it.

Besides, surprisingly, the following important fact that has never been disclosed in the prior art was found. When the grinding and the heat treatment are conducted according to the method of the present invention, the residual compressive stress is improved after the heat treatment, contrary to the result that the residual compressive stress in the processed surface is reduced by the heat treatment as reported Suzuki et al., "Material", Vol. 38, No. 429, Pages 584–585.

More specifically, according to the present invention, the ratio of the residual compressive stress after the heat treatment to that before the heat treatment (residual compressive stress after the heat treatment/residual compressive stress before the heat treatment) may be 1 or more, and further, by selecting the heat treating temperature and time, the ratio of the residual compressive stress after the heat treating/the residual compressive stress before the heat treating may preferably be 5 or more. This allows the ratio of the strength of the silicon nitride ceramic component after the heat treatment to that before the heat treatment (strength after the heat treatment/strength before the heat treatment) to be 1.2 or more, preferably 1.5 or more with remarkable restoration of the strength.

A series of these phenomena will be settled as follows:

(1) In the silicon nitride sintered body, the residual compressive stress is generated in the processed surface (actually, in crystalline grains) by the grinding.

(2) If the above is subjected to the heat treatment, it is expected that the residual stress generated in the grinding process is once weakened or released to a certain degree by the heat and lowered, similarly to that as disclosed in conventional reports.

(3) However, in the method of the present invention, the heat treatment is performed in the air, allowing formation of the glassy phase of oxides, such as $SiO_2$ formed between Si and O on the surface layer, and simultaneously, it is expected that due to the difference of thermal heat expansion coefficients between crystal grains of $\alpha$-$Si_3N_4$ and $\beta'$-sialon, great residual compressive stress is generated by heat treating and subsequent cooling while being permitted to stand.

In this event, the average crystalline grain sizes of $\alpha$-$Si_3N_4$ and $\beta'$-sialon are smaller than ever. This increases the total surface area of the both crystalline grains. Accordingly, oxidation reaction by the heat treatment proceeds at a higher rate than ever and occurs in a wide range, which may be a probable cause of generating the residual compressive stress. On the contrary, in the sintered body formed of $\alpha'$-$Si_3N_4$ and $\beta'$-$Si_3N_4$ as disclosed in Japanese Patent Laid-Open No. 2-44066, $\alpha'$-$Si_3N_4$ crystals are a solid solution formed by firing at a high temperature of 1700° C. or higher. Therefore, the crystals are apt to grow to large course grains, and an effect of increasing the residual compressive stress by refining the crystalline grains, as referred to in the present invention, cannot be expected.

(4) Further, in producing the $Si_3N_4$ sintered body, when essential sintering aids of $Y_2O_3$, $Al_2O_3$ and AlN and at least one additional sintering aid selected from the group consisting of oxides such as MgO, $TiO_2$, $ZrO_2$ and $HfO_2$ and composite oxides such as $MgAl_2O_4$ are added, it is found that these assistant elements, especially Al and Mg, are diffused and moved in preference by the heat treatment to the portion near the material surface. Additionally, the crystalline grains of the sintered body obtained are extremely fine, which increases the area of the crystalline grain boundary adjacent thereto. Accordingly, diffusion and movement of the sintering aids are made easy and accelerated in a wide range. This would provide additional residual compressive stress while increasing the residual compressive stress mentioned in the above (3).

Further, it is found that the increasing degree of the residual compressive stress after the heat treatment is greater when a grinding with high efficiency is conducted by using a diamond grinding wheel of a larger grain size other words, it is greater as the surface roughness after the grinding is larger. This is because the grinding cracks caused by the grinding are present from the surface to the deep inner layer and the area of the formation of oxide extends up to the inner layer of the material.

However, when the ten-point mean roughness (Rz) of the processed surface exceeds 7 μm, the cracks caused by the grinding affect the material more than the residual compressive stress generated by the subsequent heat treatment. Accordingly, no significant restoration is found in the strength even when conducting the heat treatment, for example, at 1000° C. for an hour in the air.

On the other hand, when the ten-point mean roughness (Rz) is for example 2.34 μm (grain size of grinding stone; #200), the material of about 100 kg/mm² in average flexural strength before the heat treatment is restored to have the strength of about 180 kg/mm² which is higher than the strength of a defect-free material (without heat treatment). On the contrary, when Rz is smaller than the lower limit of the present invention, for example 0.07 μm (grain size of grinding stone; #1500), the average flexural strength before the heat treatment is 206 kg/mm², while that after the heat treatment is only little improved, i.e., 228 kg/mm².

Thus, as a rate of increasing the residual compressive stress after the heat treatment becomes greater, the rate of increasing the flexural strength tends to be large. It is found that the residual compressive stress significantly contributes to the restoration of the strength. At the same time, the flexural strength depends on the balance of the residual compressive stress and the grinding crack caused by the grinding process.

Various attempts have been made to restore the strength, by using the crack healing effect of the glassy phase formed by the heat treatment, the coating of different materials on the base material surface, or the introduction of the residual compressive stress to the material surface by quenching. While, in the present invention, with a specific combination of the material composition, crystalline phase and grain size with the synergetic effect of the surface roughness determined depending on the grinding condition, the oxide film formed by the heat treatment and the assistant elements diffused and moved to the surface, the residual compressive stress in the processed surface can be remarkably improved with restoration of the strength associated therewith.

EXAMPLE 1

The $Si_3N_4$ raw material powder used was $Si_3N_4$ having an average grain size of 0.5 μm, an a crystallization rate of 96%, and an oxygen content of 1.4% by weight, to which added as sintering aids were 5% by weight of $Y_2O_3$ powder having an average grain size of 0.8 μm, 5% by weight of $Al_2O_3$ powder having an average grain size of 0.4 μm, 1% by weight of AlN powder having an average grain size of 0.5 μm and 1% by weight of MgO powder having an average grain size of 0.2 μm.

These powders were mixed by using a nylon ball mill for 72 hours in ethanol, and were dried, then be CIP compacted at 3000 kg/mm². The resultant compact body was subjected to primary sintering at 1550° C. for 3 hours in an atmosphere of 1 atm of $N_2$ gas, following which secondary sintering was conducted at 1650° C. for one hour in an atmosphere of 1000 atm of $N_2$ gas. In the $Si_3N_4$ sintered body so obtained, $\alpha$-$Si_3N_4$ had an average grain size of 0.5 μm, and $\beta'$-sialon had an average grain size of 3.0 μm in major axis and 1.0 μm in minor axis, respectively.

A plurality of flexural strength test pieces (3×4×30 mm) of this sintered body were made according to JIS R1601 and were subjected to grinding (finishing with #800) in a direction parallel to the longitudinal direction. Next, with a #200 diamond wheel, single pass grinding was conducted in a direction perpendicular to the longitudinal direction of the test pieces in which degradation of the strength was found remarkably. It is noted that the ten-point mean roughness (Rz) of the ground surface was in the range of 3.8±0.5 μm.

In addition, the four-point flexural strength of the test pieces after grinding was 115 kg/mm².

Subsequently, a plurality of the test pieces ground in the condition as mentioned above were heat treated at a temperature range of 700°–1300° C. for 0.25–9 hours in the air and were then permitted to stand for cooling. With respect to each test piece so obtained, the residual stress in the processed surface before and after the heat treatment were measured by using an X-ray stress-micrometer, and a four-point flexural strength was also measured in accordance with JIS R1601. These tests were conducted for 15 test pieces for each condition, and an average value for each test condition was calculated, as set forth in Table 1. The measuring conditions for the residual stress are shown in Table 2. In Table 2, "residual compressive stress ratio" is the ratio of residual compressive stress after the heat treatment/residual compressive stress before the heat treatment.

TABLE 1

| Sample | Heat Treatment Condition Temperature (°C.) | Time (hr) | Flexural strength (kg/mm²) | Residual compressive stress ratio |
| --- | --- | --- | --- | --- |
| 1* | 700 | 1 | 131 | 2.58 |
| 2* | 700 | 5 | 137 | 2.69 |
| 3 | 800 | 0.5 | 182 | 6.32 |
| 4 | 800 | 1 | 183 | 6.43 |
| 5 | 800 | 3 | 188 | 6.80 |
| 6 | 900 | 0.5 | 190 | 6.60 |
| 7 | 900 | 1 | 193 | 6.68 |
| 8 | 900 | 3 | 199 | 7.01 |
| 9 | 900 | 5 | 209 | 7.14 |
| 10 | 950 | 0.5 | 206 | 7.08 |
| 11 | 950 | 1 | 210 | 7.21 |
| 12 | 950 | 2 | 211 | 7.36 |
| 13 | 1000 | 0.25 | 203 | 7.08 |
| 14 | 1000 | 1 | 216 | 7.26 |
| 15 | 1000 | 4 | 209 | 7.48 |
| 16 | 1000 | 9 | 186 | 7.76 |
| 17 | 1050 | 0.5 | 208 | 7.15 |
| 18 | 1050 | 1 | 213 | 7.20 |
| 19 | 1050 | 2 | 210 | 7.33 |
| 20 | 1100 | 0.25 | 191 | 7.60 |
| 21 | 1100 | 1 | 190 | 7.80 |
| 22 | 1100 | 4 | 187 | 8.01 |
| 23 | 1200 | 0.25 | 185 | 8.97 |
| 24 | 1200 | 2 | 181 | 9.31 |
| 25 | 1200 | 5 | 179 | 9.59 |
| 26* | 1300 | 0.25 | 143 | 9.77 |
| 27* | 1300 | 1 | 130 | 10.41 |

(Note)
In the table, samples with * are comparative examples.
The mean flexural strength of the sample pieces were 115 kg/mm² before the heat treatment after the grinding.

TABLE 2

Residual Stress Measuring Conditions

| | |
| --- | --- |
| Characteristic X-ray: | Cr—Kα beam |
| Diffraction peak: | β-Si$_3$N$_4$ (212) |
| Angle of Diffraction: | 2θ = 131.5 (deg) |
| Young's modulus: | 285.0 (GPa) |
| Poisson's ratio: | 0.27 |
| Constant of Stress: | −882.8 (MPa/deg) |

As apparent from Table 1, within the temperature range of the heat treatment according to this invention, the ratio of the residual compressive stresses before and after the heat treatment becomes 6 or more with a remarkable restoration of the strength. A significant effect of reinforcement was recognized particularly in the temperature of 950°–1050° C. In the sample No. 16 heat-treated for a longer time, the strength was slightly reduced compared with the other samples at the same temperature though the strength was improved.

EXAMPLE 2

Grinding (finishing with #800) was conducted, in a direction parallel to the longitudinal direction, on a plurality of test pieces formed of Si$_3$N$_4$ sintered bodies A–B according to the present invention and Si$_3$N$_4$ sintered bodies C–G as comparative examples, as indicated in Table 3. Subsequently, with various diamond grinding wheels of from #80 to 2000, single pass grinding was conducted in a direction perpendicular to the longitudinal direction of each test piece in which the degradation of the strength was distinctly found. Each ten-point mean roughness (Rz) of the processed surface ground by each grinding wheel was in the range of 1–3 μm.

TABLE 3

| Sample | α-Si$_3$N$_4$ Grain size (μm) | α'-Si$_3$N$_4$ Grain size (μm) | β'-sialon Grain size in major axis (μm) | β'-sialon Grain size in minor axis (μm) |
| --- | --- | --- | --- | --- |
| A | 0.5 | — | 3.0 | 1.0 |
| B | 0.3 | — | 2.5 | 0.7 |
| C* | 1.0 | — | 7.0 | 3.5 |
| D* | 1.5 | — | 4.5 | 2.5 |
| E* | — | 5.0 | 8.0 | 3.0 |
| F* | — | 2.0 | 3.5 | 2.0 |
| G* | — | 0.5 | 5.0 | 1.0 |

(Note)
In the table, samples with * are comparative examples.

Each ground test piece was heat treated at 1000° C. for one hour in the air and was then permitted to stand for cooling. The residual stresses in the processed surface before and after the heat treatment were measured in the same way as in Example 1. The residual stresses were measured for 15 pieces for each material with and without the heat treatment with reference to the parallel and perpendicular directions to the grinding direction (longitudinal direction) to obtain each average value (unit: MPa). The results are shown in Table 4.

TABLE 4

| Sample | Grain size of grinding wheel | Material without heat treatment Parallel direction | Material without heat treatment Perpendicular direction | Heat treated material Parallel direction | Heat treated material Perpendicular direction |
| --- | --- | --- | --- | --- | --- |
| A | #80 | −126 | −150 | −685 | −710 |
| | #100 | −105 | −128 | −627 | −665 |
| | #200 | −92 | −106 | −593 | −610 |
| | #400 | −76 | −87 | −529 | −564 |
| | #800 | −59 | −64 | −445 | −489 |
| | #1500 | −42 | −50 | −359 | −377 |
| B | #80 | −128 | −163 | −876 | −920 |
| | #100 | −118 | −134 | −759 | −846 |
| | #200 | −103 | −125 | −684 | −731 |
| | #400 | −83 | −94 | −523 | −592 |
| | #800 | −63 | −68 | −489 | −526 |
| | #1500 | −45 | −58 | −376 | −403 |
| | #2000 | −38 | −45 | −315 | −328 |
| C* | #80 | −178 | −258 | −162 | −228 |
| | #100 | −153 | −236 | −132 | −219 |
| | #200 | −134 | −210 | −110 | −184 |

TABLE 4-continued

| Sample | Grain size of grinding wheel | Residual stress of ground surface (MPa) | | | |
|---|---|---|---|---|---|
| | | Material without heat treatment | | Heat treated material | |
| | | Parallel direction | Perpendicular direction | Parallel direction | Perpendicular direction |
| | #400 | −109 | −143 | −89 | −128 |
| | #800 | −96 | −90 | −74 | −98 |
| | #1500 | −86 | −65 | −76 | −70 |
| | #2000 | −51 | −46 | −32 | −50 |
| D* | #80 | −161 | −231 | −130 | −195 |
| | #100 | −145 | −198 | −132 | −163 |
| | #200 | −126 | −154 | −114 | −143 |
| | #400 | −103 | −116 | −90 | −103 |
| | #800 | −83 | −101 | −75 | −84 |
| | #1500 | −65 | −78 | −53 | −70 |
| | #2000 | −48 | −51 | −46 | −50 |
| E* | #80 | −154 | −220 | −126 | −198 |
| | #100 | −141 | −182 | −118 | −172 |
| | #200 | −123 | −164 | −106 | −148 |
| | #400 | −108 | −142 | −90 | −125 |
| | #1500 | −73 | −87 | −65 | −63 |
| | #2000 | −54 | −58 | −48 | −42 |
| F* | #80 | −146 | −208 | −128 | −200 |
| | #100 | −124 | −179 | −115 | −168 |
| | #200 | −118 | −156 | −102 | −125 |
| | #400 | −98 | −135 | −84 | −118 |
| | #800 | −84 | −118 | −72 | −104 |
| | #1500 | −70 | −83 | −61 | −72 |
| | #2000 | −45 | −53 | −42 | −49 |
| G* | #80 | −134 | −185 | −191 | −234 |
| | #100 | −114 | −162 | −142 | −192 |
| | #200 | −92 | −131 | −124 | −158 |
| | #400 | −79 | −112 | −104 | −135 |
| | #800 | −68 | −92 | −97 | −123 |
| | #1500 | −54 | −69 | −71 | −88 |
| | #2000 | −48 | −50 | −62 | −74 |

(Note)
In the table, samples with * are comparative examples.

In the samples A–B of the $Si_3N_4$ sintered body of the present invention, the residual stresses in the surface before and after the heat treatment were compressive regardless of the grain size of the grinding wheel (roughness of the ground surface) and the increase of the residual compressive stress after the heat treatment was extremely great. On the contrary, the samples C–G as comparative examples, exhibited no or less increase in residual compressive stress after the heat treatment.

EXAMPLE 3

Test pieces of the $Si_3N_4$ sintered body of the present invention (having the same average crystalline grain size as in Example 1) were produced in the same way as in Example 1, and were subjected to grinding under the same condition as in Example 2. The test pieces were then heat treated at 1000° C. for one hour in the air, and then permitted to stand for cooling. With respect to each test piece (sample H) so obtained, the four-point flexural strengths and the residual compressive stresses before and after the heat treatment were measured in a similar manner to Example 1. Table 5 shows results thereof and the ratio of the strength and the residual compressive stress after the heat treatment to those before the heat treatment.

For comparison, similar treatments were conducted to the conventional $Si_3N_4$ sintered bodies produced by using $Y_2O_3$, $Al_2O_3$ and AlN as sintering aids. The strength and the residual compressire stress were measured for the resultant conventional test pieces (sample I). The conventional $Si_3N_4$ sintered bodies were composed of a $\beta\text{-}Si_3N_4$ single crystalline phase, and the crystalline grains of $\beta\text{-}Si_3N_4$ had an average grain size of 3–5 μm in major axis and 1–2 μm in minor axis.

TABLE 5

| Sample | Grain size of grinding wheel | Surface roughness Rz (μm) | Flexural Strength | | Strength ratio** | Weibull modulus | Residual compressive stress ratio |
|---|---|---|---|---|---|---|---|
| | | | Before heat treatment (kg/mm²) | After heat treatment (kg/mm²) | | | |
| H-1* | #80 | 12.56 | 63 | 73 | 1.16 | 19 | 4.73 |
| 2* | #100 | 10.03 | 76 | 92 | 1.21 | 21 | 5.19 |
| 3 | #200 | 6.42 | 127 | 216 | 1.70 | 32 | 5.75 |
| 4 | #400 | 3.63 | 136 | 218 | 1.60 | 35 | 6.48 |
| 5 | #800 | 1.08 | 165 | 220 | 1.33 | 37 | 7.64 |
| 6* | #1500 | 0.28 | 206 | 228 | 1.11 | 38 | 7.54 |
| 7* | #2000 | 0.01 | 219 | 221 | 1.01 | 38 | 7.07 |
| I-1* | #80 | 12.64 | 25 | 27 | 1.08 | 12 | 0.84 |
| 2* | #100 | 10.26 | 36 | 40 | 1.11 | 13 | 0.82 |
| 3* | #200 | 6.34 | 44 | 49 | 1.11 | 17 | 0.92 |
| 4* | #400 | 3.68 | 74 | 84 | 1.14 | 18 | 0.89 |
| 5* | #800 | 1.12 | 94 | 105 | 1.12 | 18 | 0.83 |
| 6* | #1500 | 0.21 | 110 | 118 | 1.07 | 20 | 0.89 |
| 7* | #2000 | 0.02 | 116 | 120 | 1.03 | 21 | 0.98 |

(Note)
In the table, samples with * are comparative examples.
**Ratio of flexural strength after heat treatment/flexural strength before heat treatment As is clear from Table 5, samples H which were produced from the material of the present invention were apt to restore the strength in addition to the increase of the residual compressive stress compared with the conventional samples I. And in the samples H-3 to 5 within the range of the surface roughness of the present invention, the restoration of the strength was significant compared with others, the Weibull modulus was also greatly improved, and additionally, the absolute value of the strength was much greater.

EXAMPLE 4

Test pieces of the $Si_3N_4$ sintered body of the present invention (having the same average crystalline grain size as that of Example 1) were produced similarly to Example 1, and were subjected to single pass grinding in a direction perpendicular to the longitudinal direction of the test pieces in which the degradation of the strength was distinctly found, by using two kinds of diamond wheels #100 and #200, thereby obtaining the test pieces having various ten-point mean roughness (Rz) depending on the various grinding conditions shown in Table 6.

The test pieces (sample J) prepared from the material of the present invention were heat treated at 1000° C. for one hour in the air, and then permitted to stand for cooling. With respect to each test piece so obtained, the four-point flexural strengths before and after the heat treatment was measured similarly to Example 1. The results are shown in Table 6.

For comparison, regarding the conventional $Si_3N_4$ sintered body of $\beta$-$Si_3N_4$ single crystalline phase in which the average crystalline grain size was 4 μm in major axis and 2 μm in minor axis, the same treatments were also performed, and the strength was similarly measured for the conventional test pieces (sample K) so obtained. The results are shown in Table 6.

From the result of Table 6, in the samples J-1, 2, 6–8 within the range of surface roughness according to the present invention, the absolute values of the strength obtained were very large, and the restoration of the strength was distinguished compared with the others. However, when the surface roughness exceeded 7 μm, it was found that the restoration of the strength and the absolute value of the strength were rapidly reduced even if the test pieces had been prepared from the material of the present invention.

According to the present invention, at the time of making a mechanical part of a predetermined shape by grinding a silicon nitride sintered body, a silicon nitride ceramic component having a high strength and high reliability can be provided, in which the degradation of the strength caused by the grinding can be greatly restored and improved, by using a sintered body having the above-mentioned refined structure, grinding the sintered body to provide a component having a proper surface roughness and performing heat treatment and natural cooling in the air on the ground component.

What is claimed is:

1. A method of producing a silicon nitride ceramic component, comprising: grinding a silicon nitride sintered body comprising $\alpha$-$Si_3N_4$ having an average grain size of 0.5 μm or smaller and $\beta'$-sialon having an average grain size of 3 μm or smaller in its major axis and 1 μm or smaller in its minor axis into a predetermined size with a surface roughness of 1–7 μm in ten-point mean roughness; heat treating the ground sintered body in a temperature range of 800°–1200° C. in air; and allowing the same to be cooled by standing, thereby providing a residual compressive stress in the ground surface before and after the heat treatment at a ratio of 1 or higher (residual compressive stress after the heat treating/residual compressive stress before the heat treating).

2. A method of producing a silicon nitride ceramic component according to claim 1 wherein the heat treatment is conducted for from 15 minutes to 5 hours.

TABLE 6

| Sample | Grain size of grinding wheel | Wheel depth of cut (μm) | Surface roughness Rz (μm) | Flexural Strength | | Strength ratio** |
|---|---|---|---|---|---|---|
| | | | | Before heat treatment (kg/mm²) | After heat treatment (kg/mm²) | |
| J-1 | #100 | 1 | 3.55 | 126 | 176 | 1.40 |
| 2 | #100 | 3 | 5.82 | 106 | 163 | 1.54 |
| 3* | #100 | 5 | 7.79 | 72 | 86 | 1.19 |
| 4* | #100 | 7 | 10.46 | 53 | 61 | 1.15 |
| 5* | #100 | 10 | 13.37 | 35 | 42 | 1.20 |
| 6 | #200 | 1 | 1.42 | 140 | 218 | 1.56 |
| 7 | #200 | 3 | 3.57 | 131 | 214 | 1.63 |
| 8 | #200 | 5 | 6.78 | 123 | 210 | 1.70 |
| 9* | #200 | 7 | 7.83 | 74 | 96 | 1.30 |
| 10* | #200 | 10 | 9.63 | 48 | 60 | 1.25 |
| K-1* | #100 | 1 | 3.53 | 96 | 110 | 1.15 |
| 2* | #100 | 3 | 5.78 | 74 | 87 | 1.18 |
| 3* | #100 | 5 | 7.83 | 56 | 64 | 1.14 |
| 4* | #100 | 7 | 10.40 | 48 | 53 | 1.10 |
| 5* | #100 | 10 | 13.21 | 32 | 34 | 1.06 |
| 6* | #200 | 1 | 1.48 | 138 | 154 | 1.12 |
| 7* | #200 | 3 | 3.54 | 101 | 113 | 1.12 |
| 8* | #200 | 5 | 5.69 | 78 | 83 | 1.06 |
| 9* | #200 | 7 | 7.87 | 52 | 58 | 1.12 |
| 10* | #200 | 10 | 9.68 | 45 | 47 | 1.04 |

(Note)
In the table, samples with * are comparative examples.
**Ratio of flexural strength after heat treatment/flexural strength before heat treatment 3. A method of producing a silicon nitride ceramic component according to claim 1 wherein the residual compressive stress ratio is 5 or higher.

4. A method of producing a silicon nitride ceramic component according to claim 2 wherein the residual compressive stress ratio is 5 or higher.

5. A method of producing a silicon nitride ceramic component according to claim 1 wherein sintering aids used for producing said silicon nitride sintered body comprise $Y_2O_3$, $Al_2O_3$ and AlN as essential sintering aids and at least one sintering aid selected from the group consisting of MgO, $TiO_2$, $ZrO_2$, and $HfO_2$ and composite $MgAl_2O_4$.

6. A method of producing a silicon nitride ceramic component according to claim 2 wherein sintering aids used for producing said silicon nitride sintered body comprise $Y_2O_3$, $Al_2O_3$ and AlN as essential sintering aids and at least one sintering aid selected from the group consisting of MgO, $TiO_2$, $ZrO_2$, and $HfO_2$ and composite $MgAl_2O_4$.

7. A method of producing a silicon nitride ceramic component according to claim 3 wherein sintering aids used for producing said silicon nitride sintered body comprise $Y_2O_3$, $Al_2O_3$ and AlN as essential sintering aids and at least one sintering aid selected from the group consisting of MgO, $TiO_2$, $ZrO_2$, and $HfO_2$ and composite $MgAl_2O_4$.

8. A method of producing a silicon nitride ceramic component according to claim 4 wherein sintering aids used for producing said silicon nitride sintered body comprise $Y_2O_3$, $Al_2O_3$ and AlN as essential sintering aids and at least one sintering aid selected from the group consisting of MgO, $TiO_2$, $ZrO_2$, and $HfO_2$ and composite $MgAl_2O_4$.

9. A method of producing a silicon nitride ceramic component according to claim 1 wherein a ratio of the strength of the silicon nitride ceramic component (strength after the heat treating/strength before the heat treating) is 1.2 or higher.

10. A method of producing a silicon nitride ceramic component according to claim 2 wherein a ratio of the strength of the silicon nitride ceramic component (strength after the heat treating/strength before the heat treating) is 1.2 or higher.

11. A method of producing a silicon nitride ceramic component according to claim 3 wherein a ratio of the strength of the silicon nitride ceramic component (strength after the heat treating/strength before the heat treating) is 1.2 or higher.

12. A method of producing a silicon nitride ceramic component according to claim 4 wherein a ratio of the strength of the silicon nitride ceramic component (strength after the heat treating/strength before the heat treating) is 1.2 or higher.

13. A method of producing a silicon nitride ceramic component according to claim 5 wherein a ratio of the strength of the silicon nitride ceramic component (strength after the heat treating/strength before the heat treating) is 1.2 or higher.

14. A method of producing a silicon nitride ceramic component according to claim 6 wherein a ratio of the strength of the silicon nitride ceramic component (strength after the heat treating/strength before the heat treating) is 1.2 or higher.

15. A method of producing a silicon nitride ceramic component according to claim 7 wherein a ratio of the strength of the silicon nitride ceramic component (strength after the heat treating/strength before the heat treating) is 1.2 or higher.

16. A method of producing a silicon nitride ceramic component according to claim 8 wherein a ratio of the strength of the silicon nitride ceramic component (strength after the heat treating/strength before the heat treating) is 1.2 or higher.

* * * * *